US006266163B1

United States Patent
Hirakawa (10) Patent No.: US 6,266,163 B1
(45) Date of Patent: *Jul. 24, 2001

(54) IMAGE READING METHOD AND APPARATUS

(75) Inventor: Takashi Hirakawa, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,489

(22) Filed: Jun. 29, 1998

(30) Foreign Application Priority Data

Jun. 30, 1997 (JP) .................................... 9-173731

(51) Int. Cl.[7] ....................................... H04N 1/04
(52) U.S. Cl. ........................................ 358/475; 358/474
(58) Field of Search ..................... 358/475, 509, 358/487, 505, 474; 362/516, 518, 347, 346, 297, 17; 399/221; 355/67

(56) References Cited

U.S. PATENT DOCUMENTS

| | | | | |
|---|---|---|---|---|
| 4,143,964 | * | 3/1979 | Ogura et al. | 355/67 |
| 4,557,592 | * | 12/1985 | Yokoyama et al. | 399/151 |
| 4,653,904 | * | 3/1987 | Imamura | 355/68 |
| 4,769,718 | * | 9/1988 | Imamura | 358/474 |
| 4,851,975 | * | 7/1989 | Kanai | 362/217 |
| 5,012,283 | * | 4/1991 | Shimono et al. | 399/191 |
| 5,075,720 | * | 12/1991 | Takada et al. | 355/67 |
| 5,624,172 | * | 4/1997 | Yamagishi | 353/98 |
| 5,673,122 | * | 9/1997 | Omori | 358/475 |
| 5,798,849 | * | 8/1998 | Tsai | 358/475 |
| 5,971,568 | * | 10/1999 | Kabuki | 362/297 |

* cited by examiner

Primary Examiner—Cheukfan Lee
(74) Attorney, Agent, or Firm—Sughrue, Mion, Zinn, Macpeak & Seas, PLLC (57) ABSTRACT

There is provided an image reading method and apparatus which, even when the position where slit light is irradiated changes due to vibration during image reading, can prevent variation of the amount of transmitted light or reflected light within a region read by a solid-state image pickup device (i.e., a read range). A reflector having a half-split structure (two parts) is disposed and each first focal point of the two parts of reflector is located at the same position (i.e., the position where a halogen lamp is disposed). Respective second focal points of the two parts of reflector are located at different positions apart from the center of an illumination region in opposite directions. The distribution of the amount of light in this case is such that a range in which the amount of light becomes substantially uniform comes to about one and a half the read width of a CCD line sensor and the ratio of the minimum amount of light in this width becomes about 80% of the maximum amount of light. Since the two parts of reflector have different second focal points, occurrence of a reading error caused by vibration is restrained.

15 Claims, 7 Drawing Sheets

PRIOR ART

IMAGE READING METHOD AND APPARATUS

BACKGROUND OF THE INVENTION

1. Field of the Invention

The present invention relates to an image reading method and apparatus, in which light from a light source is irradiated on a transmission original or a reflection original through a slit, and the transmitted light or reflected light is read by a solid-state image pickup device.

2. Description of the Related Art

As a method for reading an original image, there is known a method in which slit light, whose longitudinal direction coincides with a main scanning direction, is irradiated on an original image and is moved in a sub-scanning direction perpendicular to the main scanning direction, and light reflected by or transmitted through the original image is guided to a solid-state image pickup device (CCD sensor) via a lens, thereby allowing reading of the original image.

The slit width of the slit light is usually larger than the read width of a CCD sensor. The distribution of the amounts of slit light is set so that light reflected by a reflector which covers the back of a light source is made convergent at one point, and therefore, the distribution is formed as a so-called Gaussian distribution having a relatively sharp peak.

For this reason, during sub-scanning movement, the position where the slit light is irradiated is displaced due to vibration and the like, and the amount of light may vary within the range of the read width of the CCD sensor.

SUMMARY OF THE INVENTION

In view of the above-described circumstances, an object of the present invention is to provide an image reading method and apparatus which, even when the position where slit light is irradiated changes due to vibration during image reading, can prevent variations in the amount of transmitted or reflected light within a region read by a solid-state image pickup device (i.e., a read range).

The present invention is an image reading method and apparatus in which light emitted from a light source and reflected by a reflector is scanned on a original image via a slit, and one of light transmitted through the original image and light reflected from the original image is made to form an image on a light receiving surface of a solid-state image pickup device, thereby allowing reading of the original image, the reflector is divided into a plurality of parts, and a first focal point of each of the plurality of parts of the reflector is the light source of the reflector, and second focal point of the plurality of parts of the reflector each being located at different regions on the original image.

Also, the present invention is an image reading method and apparatus in which a diffusion glass disposed at an open end of the reflector is used.

Also, the present invention is an image reading method and apparatus in which a first focal point of the reflector is the light source of said reflector, and second focal points of the reflector are located at one of a position nearer the light source than the original image and position farther away from the light source than the original image so that the second focal points are elsewhere than on the original image.

Also, the present invention is an image reading method and apparatus in which light from a light source is made to scan an original image via a slit and one of light transmitted through the original and light reflected by the original is made to form an image on a light receiving surface of a solid-state image pickup device, thereby allowing reading of the original, wherein light made into slit light by the slit is slit light of which longitudinal direction coincides with a direction perpendicular to a scanning direction, and a width of the slit light on the light receiving surface of the solid-state image pickup device is at least one and a half times a light receiving width of the light receiving surface of the solid-state image pickup device, and the center of the width of slit light and the center of the light receiving width of the light receiving surface of the solid-state image pickup device are set so as to substantially coincide with each other, and a variation in the amount of light in the width of slit light is set to be 20% or less.

According to the present invention, even when the position where slit light is irradiated changes due to vibration or the like, the variation in the amount of light on the light receiving surface of the solid-state image pickup device is limited to a predetermined range, thereby resulting in no adverse effect exerted on the amount of light for reading. For this reason, ununiformity of the amount of light for reading, caused by vibration, can be prevented.

Namely, in the state in which the width of the slit light is at least one and a half times the light receiving width of the light receiving surface of the solid-state image pickup device and the center of the width of slit light and the center of the light receiving width of the light receiving surface of the solid-state image pickup device are set so as to coincide with each other, light beam from the light source is guided so that the variation in the amount of light within the width of slit light is set to be 20% or less.

As described above, the range in which the position where the slit light is irradiated varies due to vibration or the like is obtained experimentally and empirically and the width of slit light is set so as to be slightly larger than the obtained range. For this reason, there is no possibility that, in ordinary use (i.e., when mechanical vibration generated during image reading and resonance thereof occur), the position where the slit light is irradiated varies exceeding the above range.

An allowable range of variation in the amount of light varies in accordance with brightness of a light source, the type of an original, reading accuracy of a solid-state image pickup device, a dynamic range of the solid-state image pickup device, and the like. With these factors considered, the allowable range of variation in the amount of light is empirically and experimentally set to be 20% at the maximum. When the amount of light varies exceeding this range, there is a possibility that, when the maximum vibration occurs, for example, when the original is read while the light source is moved in a sub-scanning direction, color irregularity occurs which can be found visually on pixels disposed adjacently in the sub-scanning direction.

DESCRIPTION OF THE PREFERRED EMBODIMENTS

Figure 1:
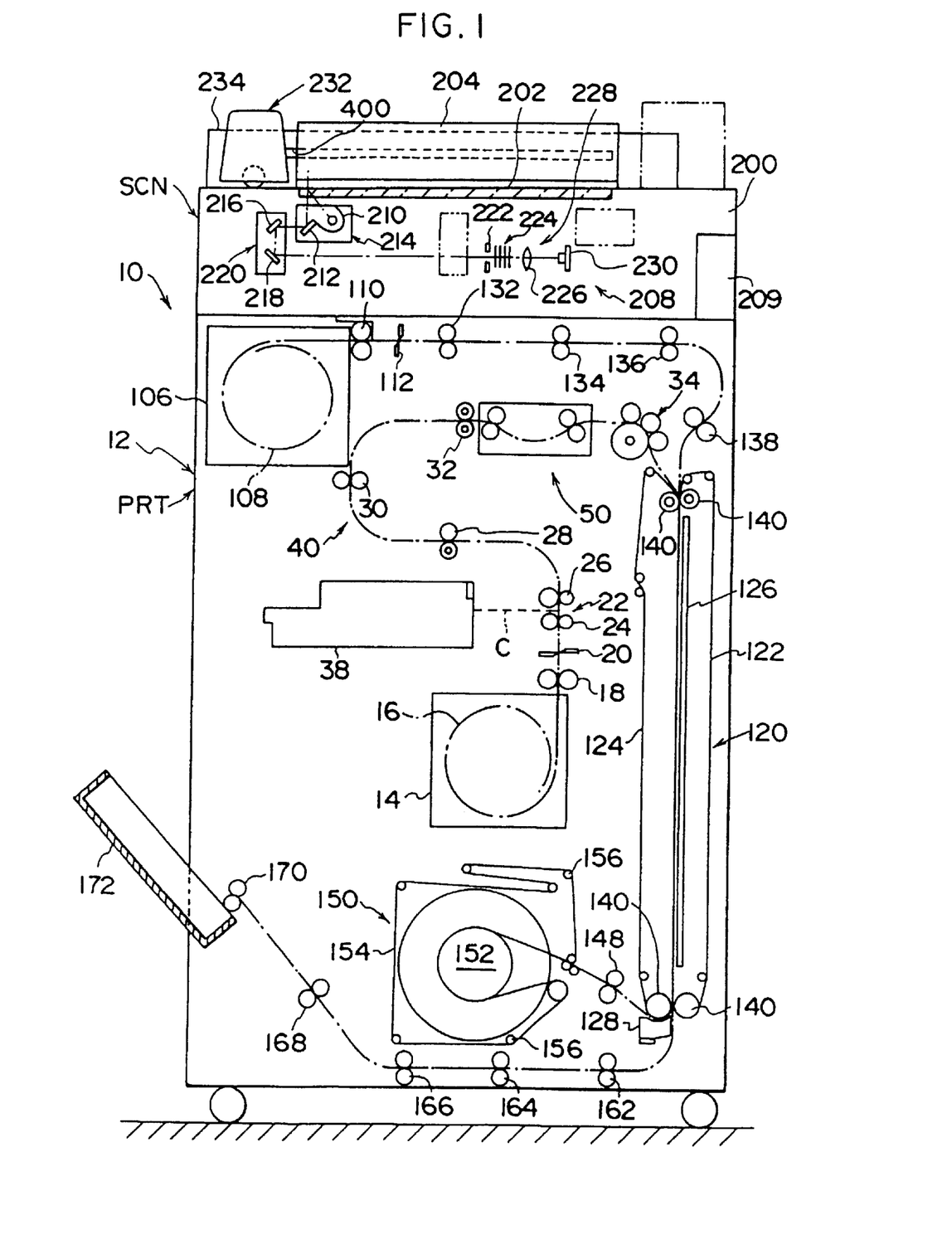
FIG. 1 is a schematic overall structural diagram of an image reading/recording apparatus according to an embodiment of the present invention.

FIG. 1 is a schematic overall structural diagram of an image reading/recording apparatus 10 according to an embodiment of the present invention.

The image reading/recording apparatus 10 is formed by a scanner section (SCN) which is an image reading section, and a printer section (PRT) for recording an image. The scanner section (SCN) is disposed on a machine stand 12, and the printer section (PRT) is disposed within the machine stand 12. (Scanner Section SCN)

The scanner section (SCN) according to the embodiment of the present invention is illustrated in FIG. 1.

The scanner section (SCN) is covered by a box-shaped casing 200. A rectangular opening is formed at the central portion of the upper surface of the casing 200, and a transparent platen glass 202 is fit therein. The platen glass 202 serves as a stand on which a planar original is placed. A reflection original having a planar image recorded thereon is placed on the platen glass 202 with the image recorded surface thereof facing downward.

Figure 2:
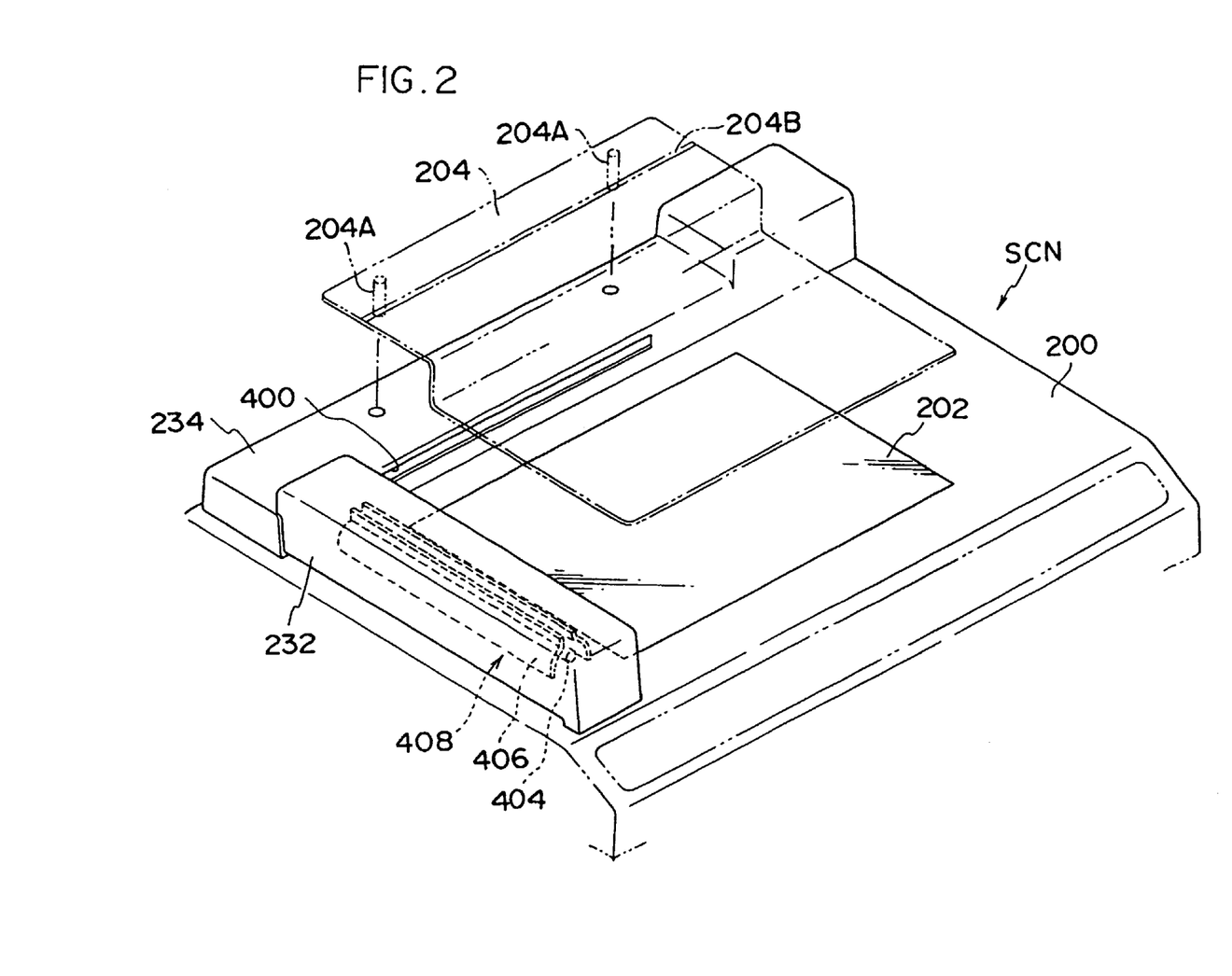
FIG. 2 is a perspective view showing an upper portion of a scanner section.

As shown in FIG. 2, a pressing cover 204 which can be opened and closed is disposed on the platen glass 202. The pressing cover 204 is mounted via pins 204A to a cover of a light source unit driving portion 234 provided at the rear side of the casing 200 as illustrated in FIG. 2. A hinge portion 204B is provided at the pressing cover 204 so that the pressing cover 204 is rotatable around the hinge portion 204B.

Accordingly, the reflection original can be pressed and held on the platen glass 202 by the pressing cover 204.

A slit-shaped cut opening 400 is formed on the side surface of the light source unit driving portion 234, which side surface faces the platen glass 202. The longitudinal direction of the cut opening 400 coincides with the left-to-right direction of FIG. 1.

An arm (not shown) extends from the cut opening 400 toward the platen glass 202. A transmission-original scanning unit 232 is connected to the arm and moves on the platen glass 202 reciprocatingly from the left to the right and back again in FIG. 1. When the pressing cover 204 is being used, the transmission-original scanning unit 232 is withdrawn to the left side of the platen glass 202 in FIG. 1.

The transmission-original scanning unit 232 includes a transmission-original light source 408 equipped with a halogen lamp 404 and a reflector 406. The transmission-original light source 408 emits light in the transverse direction of the platen glass 202 (from the front side to the rear side of FIG. 1). The transverse direction of the platen glass 202 is a main scanning direction when an original is placed on the platen glass 202.

The transmission-original light source 408 is used in a case in which a transmission original is placed on the platen glass 202. In such a case, the pressing cover 204 is opened and is withdrawn from the space in which the transmission-original scanning unit 232 moves.

An operation/display panel (not shown) is disposed at the front side (in FIG. 1) of the upper surface of the casing 200 and enables the giving of instructions of various functions of the apparatus and indicates the operating state of the apparatus.

A scanning portion 208 is provided within the casing 200 and is controlled by a controller 209. The scanning portion 208 is formed by a reflection-original light source 210 extending in the transverse direction of an original image (i.e., the main scanning direction) and having a halogen lamp and a reflector, a first carriage 214 in which the reflection-original light source 210 and a first mirror 212 extending in the transverse direction of the original image are built-in, a second carriage 220 having a second mirror 216 and a third mirror 218 built-in, a diaphragm 222, a filter unit 224 having four filters, e.g., color adjusting filters and an ND filter, and a fixed unit 228 formed by an imaging lens 226.

In the first carriage 214, light from the reflection-original light source 210 is irradiated to an original placed on the platen glass 202. Light reflected by the original (i.e., light whose optical axis extends downward) is deflected 90° by the first mirror 212 and is further guided to the second mirror 216 of the second carriage 220. Further, the first mirror 212 of the first carriage 214 allows light, which has been emitted from the transmission-original light source 408 and transmitted through the transmission original, to be guided to the second mirror 216.

In the second carriage 220, the reflecting surface of the second mirror 216 faces the first mirror 212 so as to be disposed parallel thereto. Light from the first mirror 212 is deflected 90° by the second mirror 216 and is further deflected 90° by the third mirror 218.

The light deflected by the third mirror 218 and finally made parallel to the platen glass 202 is led via the fixed unit 228 to a light receiving portion of the CCD line sensor 230. The light receiving portion of the CCD line sensor 230 is formed by three lines which each detect the amount of received light independently for each of three colors (R, G, and B).

In the fixed unit 228, the amount of light is adjusted by the diaphragm 222 and the ND filter of the filter unit 224 and color balance for each of the colors is adjusted by the color adjusting filters of the filter unit 224. Further, the lens 226 allows the original image to be imaged on the light receiving surface of the CCD line sensor 230. Meanwhile, an IR cut-off film corresponding to an IR cut-off filter adheres by evaporation to a lens surface of the color adjusting filter.

The first carriage 214 and the second carriage 220 each move below the platen glass 202 along the surface of the original reciprocatingly in a sub-scanning direction perpendicular to the main scanning direction. At this time, the second carriage 220 is provided to move in the same direction at a conveying speed which is half of the first carriage 214 so that the length of the optical path from the position where light is reflected by or transmitted through the original to the light receiving portion of the CCD line sensor 230. One reciprocating movement of the first carriage 214 and the second carriage 220 corresponds to scan of one image (when these carriages move in the forward direction, an image is read). As a result, the original image on the platen glass 202 can be read.

Meanwhile, the transmission-original scanning unit 232 is disposed on the upper surface of the casing 200 in such a manner as to move above the platen glass 202 in the sub-scanning direction with a predetermined clearance maintained between the transmission-original scanning unit 232 and the platen glass 202. The transmission-original scanning unit 232 is used as a light source when the transmission original is placed on the platen glass 202.

Namely, the transmission-original scanning unit 232 effects the same operation as that of the first carriage 214 due to driving force of the light source unit driving portion 234.

When the transmission original is scanned, the transmission-original scanning unit 232 operates synchronously with the first carriage 214. At this time, when the reflection-original light source 210 of the first carriage 214 is placed in a light-out state and the transmission-original light source 408 within the transmission-original scanning unit 232 is turned on, an image of the transmission original can be obtained by the first mirror 212. The subsequent operation is the same as the case of the reflection original.

In either case of the transmission-original light source 408 and the reflection-original light source 210, light irradiated on the original is band-shaped luminous flux having a predetermined slit width. In the present embodiment, the distribution of the amount of slit light (band-shaped luminous flux) is adjusted in accordance with the read width of the CCD line sensor 230. A detailed description will be hereinafter given of the case of the transmission-original light source 408.

Figure 3A:
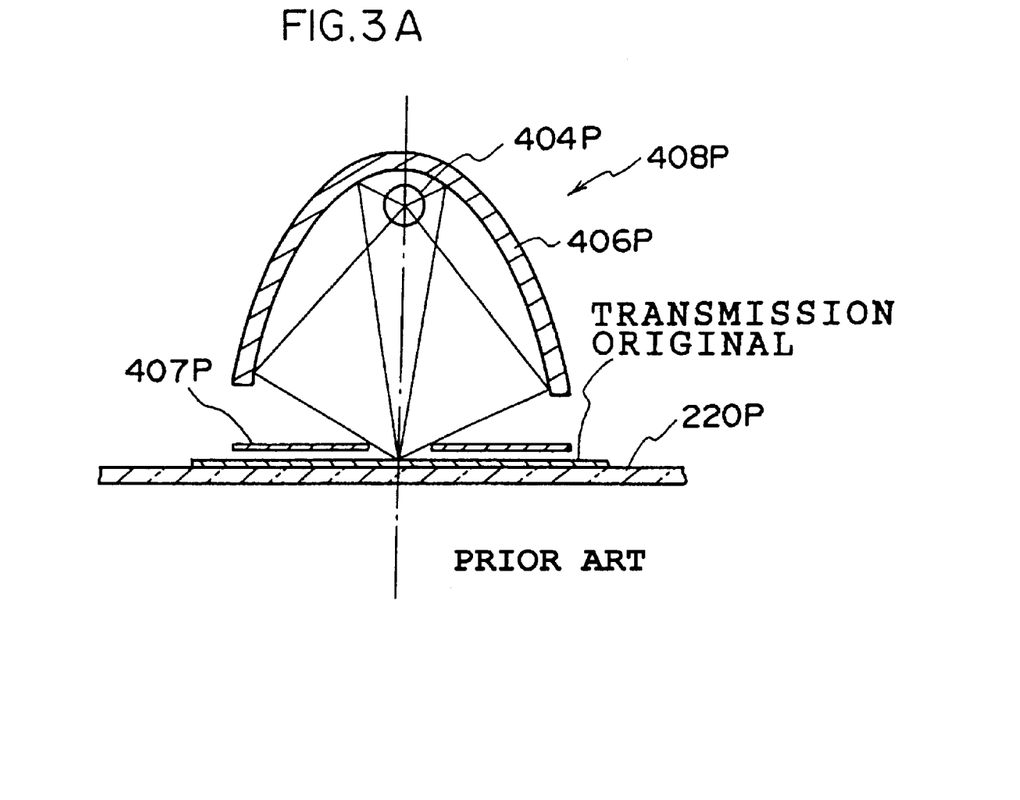
FIG. 3A is an enlarged view of a conventional light source unit (for a transmission original).
Figure 3B:
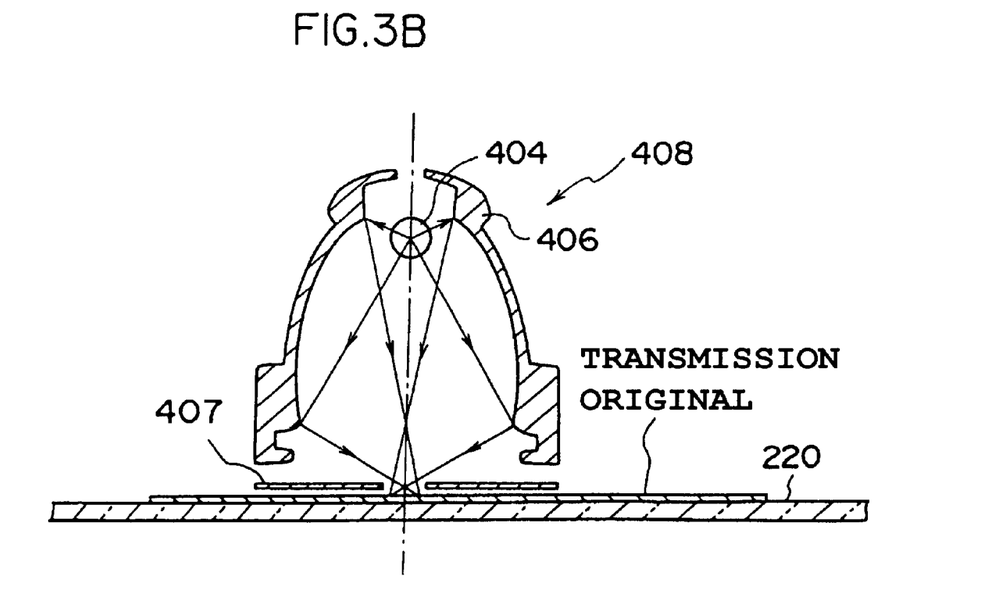
FIG. 3B is an enlarged view of a light source unit (for a transmission original) according to the embodiment of the present invention.

FIGS. 3A and 3B each show an enlarged view of a transmission-original light source. FIG. 3A shows the structure of a conventional light source. In this structure, a single reflector 406P is disposed at the rear of a halogen lamp 404P (i.e., at the side opposite to the direction in which light is guided). Further, a slit plate 407P is disposed in the vicinity of a transmission original and slit light having a predetermined width is guided to the transmission original.

The reflector 406P serves to reflect light emitted from the halogen lamp 404P and guide the reflected light in a predetermined direction. With the reflector 406P disposed at the rear of the halogen lamp 404P, light can be efficiently guided to the original. Usually, the reflecting surface of the reflector 406P is made concave in the shape of a circular arc and the halogen lamp 404P is located at a first focal position of the reflector 406P. The light emitted from the halogen lamp 404P and reflected by the reflector 406P provides a second focal point on a straight line (a dashed line in FIG. 3A) which connects the center of an illumination region and the first focal position. In fact, the reflector is not two dimensional, but is three dimensional. The line (the dashed line in FIG. 3A) is actually plane extending in the longitudinal direction of the reflector (in the direction perpendicular to the surface of the paper which FIG. 3A is on), and the second focal point is actually not a single point, but rather a line of plural focal points. However, in order to simplify this explanation, most of the following description is based on two dimensions. The distribution of the amount of light at the second focal point shows that, as indicated by the broken line in FIG. 4, the amount of light becomes large and is made uniform in a narrow region (range) near the center of the illumination region, but the amount of light in a region separated from the center of the light-irradiated region at a short distance decreases sharply. Accordingly, the amount of light having a uniform width is not sufficiently obtained for the read width of the CCD line sensor 230, and when the position where light is irradiated changes due to vibrations caused by the movement of the first carriage 214 and the second carriage 220 and resonance which adversely affects other members, the reading accuracy of the CCD line sensor 230 deteriorates.

On the other hand, the present embodiment is structured in such a manner that, as shown in FIG. 3B, two reflectors 406 having a half-split structure are provided at both sides of the halogen lamp 404 and have the same first focal point at which the halogen lamp 404 is disposed. Respective second focal points of the reflectors 406 on the transmission original are located at different positions (located on the different lines) apart from the center of the illumination region in opposite directions.

Figure 4:
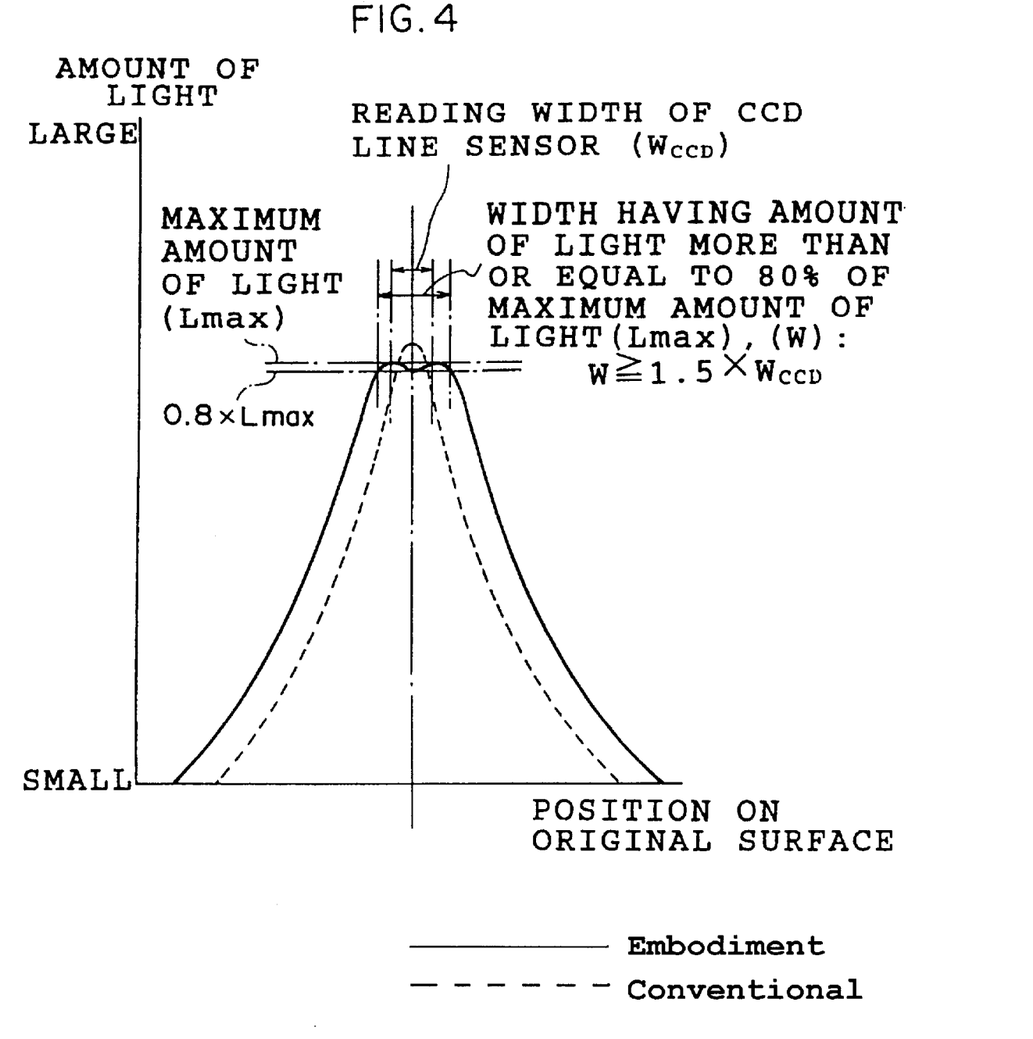
FIG. 4 shows distribution characteristic curves of the amounts of light in the light source units shown in FIGS. 3A and 3B.

The distribution of the amount of light in the above structure has the characteristic curve indicated by the solid line in FIG. 4. Namely, the region (width) where the amount of light becomes substantially uniform comes to about one and a half times the read width of the CCD line sensor 230 and the minimum amount of light within the above range becomes about 80% of the maximum amount of light.

In other words, as shown in FIG. 3B, two reflectors 406 have the different second focal points to restrain occurrence of a reading error caused by vibration.

Figure 5:
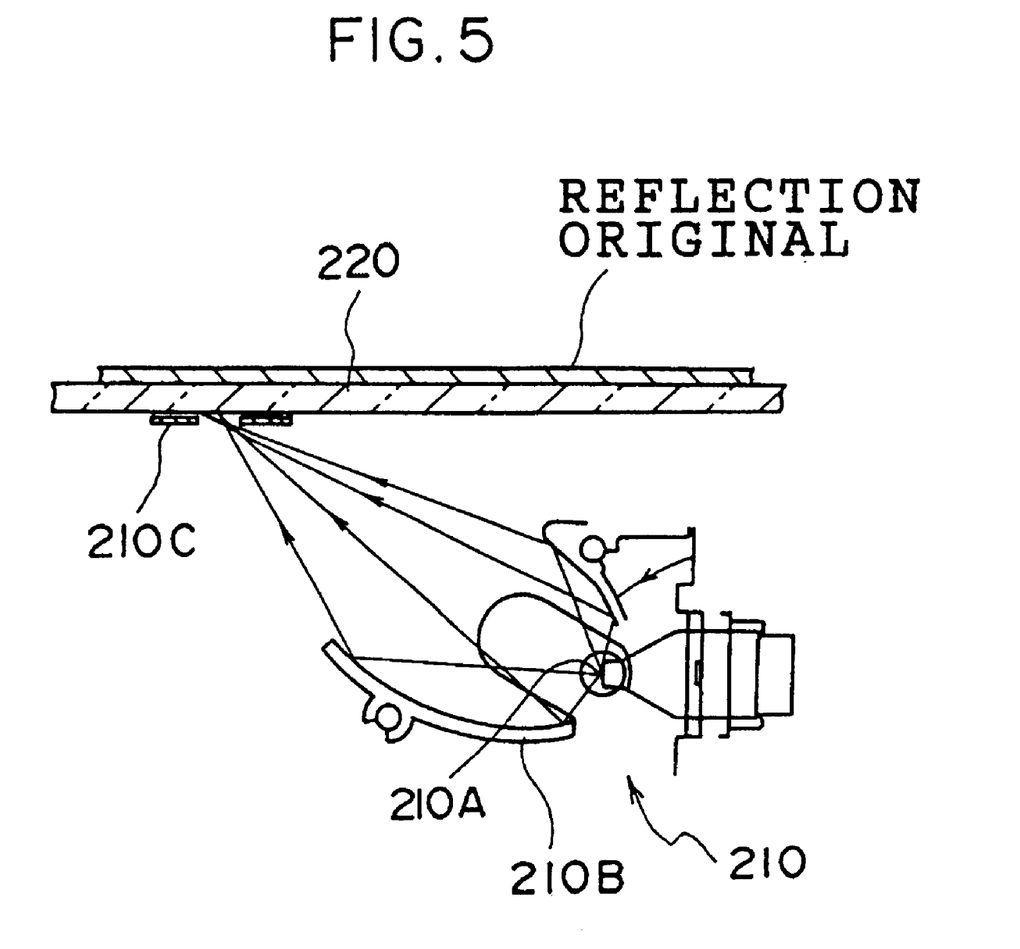
FIG. 5 is an enlarged view of a light source unit (for a reflection original) according to the embodiment of the present invention.

FIG. 5 shows an enlarged view of the reflection-original light source 210. In the reflection-original light source 210 as well, a pair of reflectors 210B are provided to have the same first focal point at which a halogen lamp 210A is disposed, and respective second focal points of the reflectors 210B on the reflection original after light passing through a slit of the slit plate 210C are located at different positions apart from the center of the illumination region on an image of the reflection original in opposite directions.

FIGS. 1 and 2 each show the printer section PRT within the machine stand 12 of the image reading/recording apparatus 10.

A photosensitive material magazine 14 in which a photosensitive material 16 is accommodated is disposed within the machine stand 12. The photosensitive material 16 is wound by the photosensitive material magazine 14 into a roll so that a light-sensitive (exposed) surface of the photosensitive material 16 pulled out from the photosensitive material magazine 14 faces toward the left side on the paper of FIG. 1.

A nip roller 18 and a cutter 20 are disposed in the vicinity of an opening of the photosensitive material magazine 14 from which the photosensitive material is pulled out, and therefore, the photosensitive material 16 can be cut after having been pulled out from the photosensitive material magazine 14 by a predetermined length. The cutter 20 is, for example, a rotary-type cutter formed from a stationary blade and a moving blade. When the moving blade is moved vertically by a rotating cam or the like so as to be engaged with the stationary blade, the photosensitive material 16 can be cut.

A plurality of conveying rollers 24, 26, 28, 30, 32, and 34 are disposed sequentially at the downstream side of the cutter 20 and guide plates (not shown) are disposed between these conveying rollers. The photosensitive material 16 cut to a predetermined length is, first, conveyed to an exposure section 22 provided between the conveying rollers 24 and 26.

An exposure device 38 is provided at the left side of the exposure section 22 on the paper of FIG. 1. The exposure device 38 is provided with three types of LD, a lens unit, a polygon mirror, and a mirror unit (all of which are not shown). Light C from the exposure device 38 is led to the exposure section 22 so as to allow the photosensitive material 16 to be exposed.

Meanwhile, in place of the structure in which the LD is moved pendulously by a polygon mirror so as to allow scan and exposure, there may be used a structure in which a plurality of light emitting diodes (LED) are arranged in the main scanning direction and one line of LED is simultaneously exposed.

Disposed above the exposure section 22 are a U-turn portion 40 and a water applying portion 50. The U-turn portion 40 conveys the photosensitive material 16 in a U-shaped curved manner, and the water applying portion 50 is used to apply an image forming solvent to the photosensitive material 16. In the present embodiment, water is used as the image forming solvent.

The photosensitive material 16 conveyed upward from the photosensitive material magazine 14 and exposed in the exposure section 22 is nipped and conveyed by the conveying rollers 28 and 30 and passes through a conveying path above the U-turn portion 40, and thereafter, the photosensitive material 16 is fed into the water applying portion 50.

On the other hand, as shown in FIG. 1, an image receiving material magazine 106 in which an image receiving material 108 is accommodated is disposed at an upper left position within the machine stand 12. A dye fixing material having a mordant is applied to an image forming surface of the image receiving material 108 and the image receiving material 108 is wound by the image receiving material magazine 106 into a roll so that the image forming surface of the image receiving material 108 pulled out from the image receiving magazine 106 faces downward.

A nip roller 110 is disposed in the vicinity of an opening of the image receiving material magazine 106 from which the image receiving material is pulled out, and can pull out the image receiving material 108 from the image receiving material magazine 106 and release nip for the image receiving material 108.

A cutter 112 is disposed at the downstream side of the nip roller 110. The cutter 112 is, in the same way as the above-described cutter 20 for the photosensitive material, a rotary-type cutter formed from a stationary blade and a moving blade. When the moving blade is moved vertically by a rotating cam or the like so as to be engaged with the stationary blade, the image receiving material 108 pulled out from the image receiving material magazine 106 is cut to a length shorter than the photosensitive material 16.

Conveying rollers 132, 134, 136, and 138, and guide plates (not shown) are disposed sequentially at the downstream side of the cutter 112 and the image receiving material 106 cut to the predetermined length can thereby be conveyed to a heat-development and transfer portion 120.

As shown in FIG. 1, the heat-development and transfer portion 120 includes a pair of loop-shaped endless belts 122 and 124 which are each wound around a plurality of winding rollers 140 and of which longitudinal direction coincides with the vertical direction. Accordingly, when any one of the winding rollers 140 is driven to rotate, the pair of endless belts 122 and 124 wound around the winding rollers 140 are respectively rotated.

A heating plate 126 which is formed into a flat plate and of which longitudinal direction coincides with the vertical direction is disposed within the loop formed by the endless belt 122 located at the right side on the paper of FIG. 1 in such a manner as to face a left-side inner peripheral portion of the endless belt 122 on the paper of FIG. 1. The heating plate 126 includes a linear heater (not shown) inside thereof, which increase the surface temperature of the heating plate 126 so as to heat the heating plate 126 at a predetermined temperature.

Accordingly, the photosensitive material 16 is conveyed by the final conveying roller 34 in the conveying path between the pair of endless belts 122 and 124 of the heat-development and transfer portion 120. Further, the image receiving material 108 is conveyed synchronously with the conveying of the photosensitive material 16, and with the photosensitive material 16 preceding the image receiving material 108 by a predetermined length, the image receiving material 108 is conveyed by the final conveying roller 138 in the conveying path between the pair of endless belts 122 and 124 of the heat-development and transfer portion 120, and thereafter, overlaps with the photosensitive material 16.

In this case, the transverse and longitudinal dimensions of the image receiving material 108 are both made smaller than those of the photosensitive material 16, and therefore, the photosensitive material 16 and the image receiving material 108 are made overlapping each other in the state in which the peripheral portion of the photosensitive material 16 at all sides projects from that of the image receiving material 108.

As a result, the photosensitive material 16 and the image receiving material 108 made overlapping each other by the pair of endless belts 122 and 124 are nipped and conveyed by these endless belts 122 and 124. When the photosensitive material 16 and the image receiving material 108 set in an overlapping state are completely held between the pair of endless belts 122 and 124, the pair of endless belts 122 and 124 temporarily stop rotating and the photosensitive material 16 and the image receiving material 108 are heated by the heating plate 126. When the photosensitive material 16 is nipped and conveyed by the endless belts and stops moving, the photosensitive material 16 is heated by the heating plate 1226 via the endless belt 122. Synchronously with the heating, the photosensitive material 16 emits mobile dye and the dye is transferred to a dye fixing layer of the image receiving material 108, thereby allowing an image to be formed on the image receiving material 108.

A peeling claw 128 is disposed at the downstream side of the pair of endless belts 122 and 124 in the direction in which the materials are conveyed. The peeling claw 128 is engaged with only the leading end of the photosensitive material 16 among the photosensitive material 16 and the image receiving material 108 nipped and conveyed by the pair of endless belts 122 and 124 and separates, from the image receiving material 108, the leading end of the photosensitive material 16 projecting from between the pair of endless belts 122 and 124.

A photosensitive material discharging roller 148 is disposed at the left side of the peeling claw 128 on the paper of FIG. 1 and allows the photosensitive material 16 guided to the peeling claw 128 and moved toward the left side to be further conveyed toward a waste material accommodating portion 150.

The waste material accommodating portion 150 includes a drum 152 onto which the photosensitive material 16 is wound, and a belt 154 which is partially wound around the drum 152. The belt 154 is also entrained across a plurality of rollers 156. When these rollers 156 are rotated, the belt 154 is driven to rotate the drum 152.

Accordingly, when the photosensitive material 16 is conveyed into the waste material accommodating portion 150 in such a state that the belt 154 is moved due to the rotation of the rollers 156, the photosensitive material 16 is accumulated around the drum 152.

On the other hand, as shown in FIG. 1, the image receiving material discharging rollers 162, 164, 166, 168, and 170 are sequentially disposed from the lower side of the pair of endless belts 122 and 124 to the left side on the paper of FIG. 1 so as to convey the image receiving material 108. The image receiving material 108 discharged from the pair of endless belts 122 and 124 is conveyed by the image receiving material discharging rollers 162, 164, 166, 168, and 170 and is finally discharged into a tray 172.

Next, operation of the present embodiment will be described.

First, a description will be given of reading control for an original image in the scanner section SCN.

When with an original placed on the platen glass 202 and the pressing cover 204 closed, an instruction to start reading is given by a key operation of the operation/display panel, scanning starts. In this scanning, the dynamic range of the CCD line sensor 230 can reliably be read by a minimum density region and adjustment is made to prevent saturation.

After the above-described adjustment is made, in the case of the reflection original, the reflection-original light source 210 is turned on and the first carriage 214 and the second carriage 220 start operating synchronously. Further, in the case of the transmission original, the transmission-original light source 408 is turned on and the first carriage 214 and the second carriage 220 start operating synchronously.

At this time, the relationship between the conveying speed of the first carriage 214, $V_1$, and the conveying speed of the second carriage 220, $V_2$, is given by the expression, $V_1=2V_2$. By maintaining the above relationship, the optical path length from the surface of an original image to the light receiving surface of the CCD line sensor 230 can constantly be maintained at a fixed value.

Image data is recorded in a RAM memory or hard disk of a personal computer or the like, and after the image data is subjected to predetermined image processing, the image data is transferred to the printer section PRT.

Here, accompanied with the movement of the first carriage 214 and the second carriage 220, the entire apparatus may vibrate. Basically, no problem arises only from the vibration caused by the movement of the first carriage 214 and the second carriage 220. However, there is a possibility that the apparatus casing or the like resonates due to the vibration of the first carriage 214 and the second carriage 220 or resonance originated in the printer section PRT occurs by concurrently use of the printer section PRT (which will be described later).

When such resonance as mentioned above is generated, slit light outputted from the reflection-original light source 210 or the transmission-original light source 408 may be shifted in the sub-scanning direction.

When the amount by which slit light is shifted is large, a wide variation in the amount of light occurs within the range of the read width (in the sub-scanning direction) and reading accuracy deteriorates.

Accordingly, in the present embodiment, as shown in FIG. 3B, the respective second focal points of the reflectors 406 and 210B on the transmission-original light source 408 and on the reflection-original light source 210 are located at different positions so as to alleviate a gradient of the distribution curve which shows variation in the amount of light. As a result, the minimum amount of light is set to be 80% or more than the maximum amount of light, within the range which is about one and a half times the read width of the CCD line sensor 230. For this reason, even when slit light is shifted in the sub-scanning direction due to vibration caused by the above-described resonance, a variation in the amount of light is small and the reading accuracy can be improved accordingly.

Figure 6:
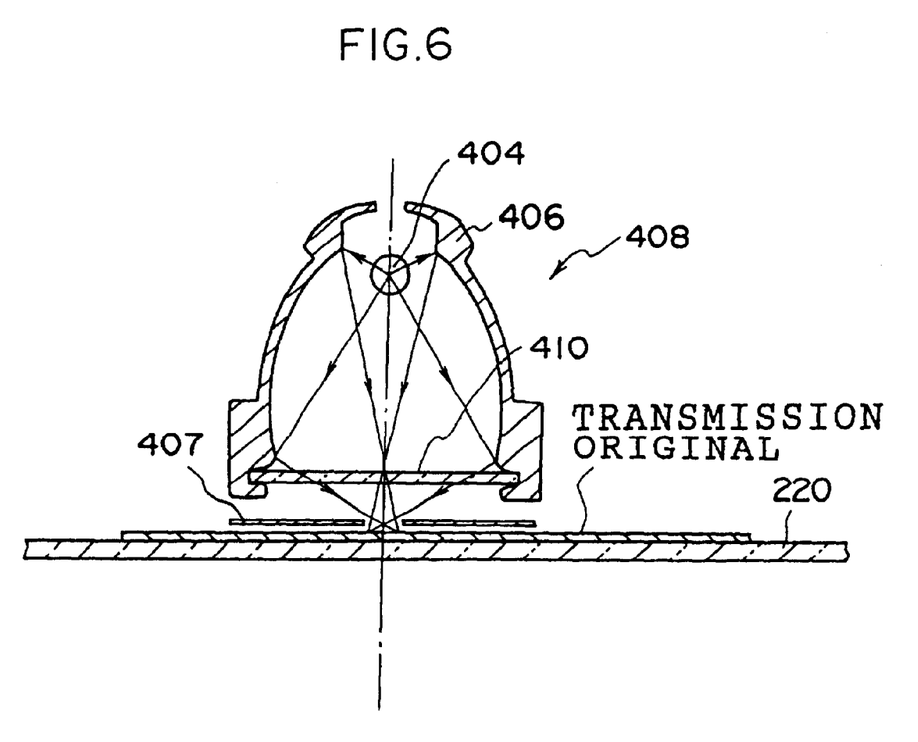
FIG. 6 is an enlarged view of a light source unit (for a transmission original) according to a modified example of the light source unit shown in FIG. 3B.
Figure 7:
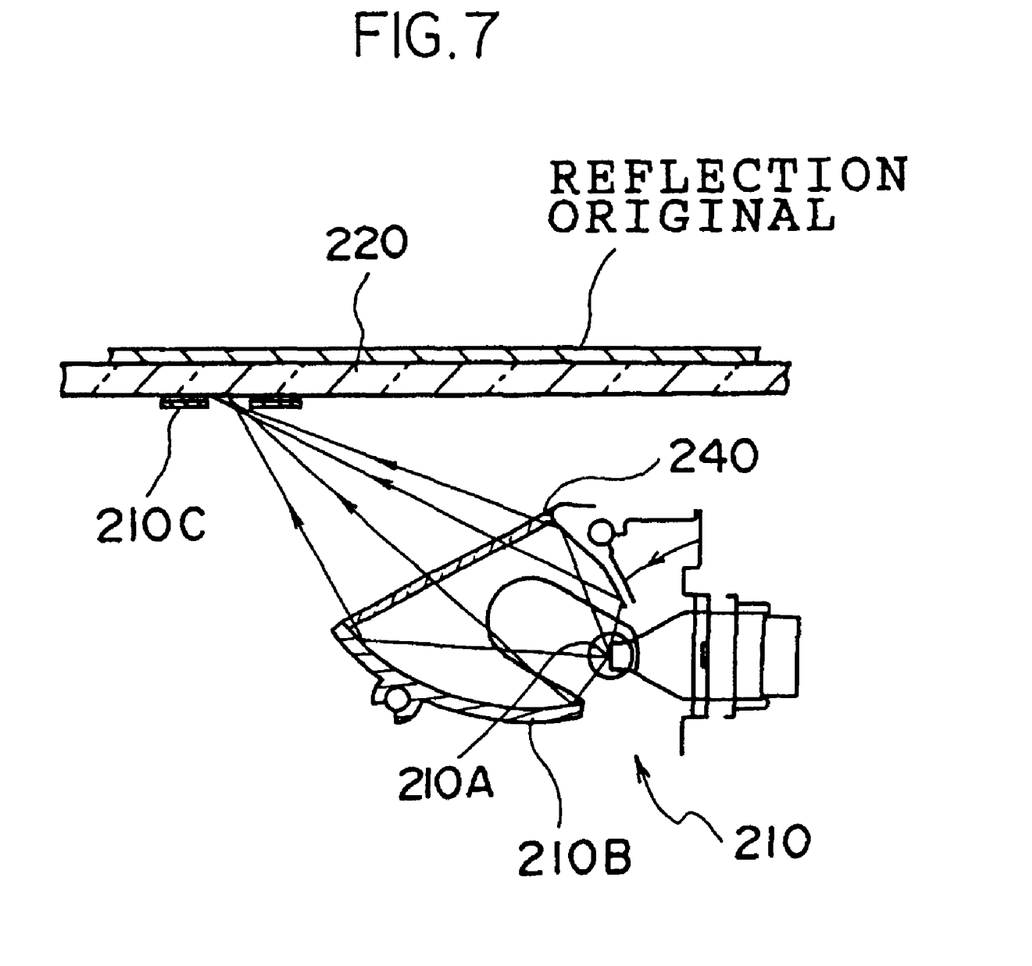
FIG. 7 is an enlarged view of a light source unit (for a reflection original) according to a modified example of the light source unit shown in FIG. 3B.

Meanwhile, in the present embodiment, the reflector 406 of the transmission-original light source 408 and the reflector 210B of the reflection-original light source 210 each have a half-split structure and the second focal point of each reflector is located at different positions apart from the center line of an illumination region of slit light in opposite directions (the first focal point of each reflector 406 and 210B is located at one position where each halogen lamp 404 and 210A is disposed), and therefore, the variation in the amount of light within a predetermined range is limited to the minimum. However, as shown in FIGS. 6 and 7, provision of diffusion glasses 410 and 240 at open ends of the reflectors 406 and 210B makes it possible to further limit the variation in the amount of light. Even when such a diffusion glass is provided in the conventional reflector of which second focal point is located at one position, the effect in that the variation in the amount of light is restrained can be obtained. However, when the diffusion glass is used in combination with the reflector according to the present embodiment in which the second focal point is disposed at different positions, the above-described effect can be further improved.

Also, in the present embodiment, the reflector 406 of the transmission-original light source 408 and the reflector 210B of the reflection-original light source 210 each have a half-split structure, the reflector 406 of the transmission-original light source 408 and the reflector 210B of the reflection-original light source 210 each can be divided into plurality of parts Further, no focusing of light reflected by each reflector 406 and 210B may be made on an original. Namely, the second focal point may be shifted in the direction of depth (in the direction perpendicular to a image original), or respective light reflected by the two parts of each reflector 406 (or 210B) may be made parallel.

Next, operation of the printer section PRT will be described.

After the photosensitive material magazine 14 has been set in place, the nip roller 18 is actuated to pull out the photosensitive material 16. When the photosensitive material 16 is pulled out by a predetermined length, the cutter 20 operates to allow the photosensitive material 16 to be cut to the predetermined length, and the photosensitive material 16 is conveyed to the exposure section 22 in such a state that a light-sensitive (exposed) surface thereof is turned toward the left side (i.e., toward the exposure section 22). Synchronously with the photosensitive material 16 passing through the exposure section 22, the exposure device 38 operates to allow an image to be scanned and exposed onto the photosensitive material 16 located in the exposure section 22. Image data read in the above-described scanner section SCN and subjected to image processing by a personal computer is inputted to the exposure device 38, and the amount of light from the light source is controlled based on the inputted data so as to allow scan and exposure of the image. When a laser (i.e., a semiconductor laser) is used as the light source, it suffices that main scan be effected by causing the optical axis of a laser beam whose amount is controlled by duty control to reciprocate pendulously and sub-scanning be effected by the movement of the photosensitive material 16.

Further, when an LED array in which a plurality of LED are arranged in the main scanning direction is used as the light source, one main scan may be effected concurrently for one line of LED in such a manner that the amount of light from the LED light source is controlled by current control or voltage control.

When exposure is completed, the exposed photosensitive material 16 is conveyed to the water applying portion 50. The photosensitive material 16 to which water serving as an image forming solvent is applied in the water applying portion 50 is conveyed by the conveying roller 34 between the pair of endless belts 122 and 124 of the heat-development and transfer portion 120.

On the other hand, synchronously with scan and exposure of the photosensitive material 16, the image receiving material 108 is also conveyed after having been pulled out from the image receiving material magazine 106 by the nip roller 110. When the image receiving material 108 is pulled out by a predetermined length, the cutter 112 operates to cut the image receiving material 108 to a predetermined length.

The image receiving material 108 cut by the cutter 112 is conveyed by the conveying rollers 132, 134, 136, and 138 while being guided by the guide plates. When the leading end of the image receiving material 108 is nipped by the conveying roller 138, the image receiving material 108 is placed in a wait state immediately before the heat-development and transfer portion 120.

Accompanied with the photosensitive material 16 being conveyed by the conveying roller 34 between the pair of endless belts 122 and 124, conveying of the image receiving material 108 starts again and the image receiving material 108 is conveyed between the pair of endless belts 122 and 124 integrally with the photosensitive material 16.

As a result, the photosensitive material 16 and the image receiving material 108 are brought into an overlapping state and are nipped and conveyed while being heated by the heating plate 126, and thereafter, heat-development and transfer processing is effected so as to allow an image to be formed on the image receiving material 108.

When these materials are discharged from the pair of endless belts 122 and 124, the peeling claw 128 is engaged with the leading end of the photosensitive material 16 conveyed preceding the image receiving material 108 by a predetermined length and the leading end of the photosensitive material 106 is thereby separated from the image receiving material 108. The photosensitive material 16 is further conveyed by the photosensitive material discharging roller 148 and is accumulated within the waste material accommodating portion 150. In this case, the photosensitive material 16 is instantaneously dried, and therefore, these is no need of an additional heater or the like for drying the photosensitive material 16.

On the other hand, the image receiving material 108 separated from the photosensitive material 16 is conveyed by the image receiving material discharging rollers 162, 164, 166, 168, and 170, and thereafter, it is discharged into the tray 172.

When a plurality of sheets of images are recorded, the above-described processes are sequentially and continuously effected.

As described above, when the image receiving material 108, which is subjected to heat-development and transfer processing in such a manner as to be nipped by the pair of endless belts 122 and 124 to allow a predetermined image to be formed (recorded) thereon, is discharged from the pair of endless belts 122 and 124, the image receiving material 108 is further nipped and conveyed by the plurality of image receiving material discharging rollers 162, 164, 166, 168, and 170, and thereafter, is discharged into the tray 172 outside the apparatus.

What is claimed is:

1. An image reading method in which light emitted from a light source and reflected by a reflector is scanned on an original image via a slit, and one of light transmitted through said original image and light reflected by said original image is made to form an image on a light receiving surface of a solid-state image pickup device, thereby allowing reading of said original image, wherein said reflector is divided into a plurality of reflector parts disposed about said light source, each of said plurality of reflector parts being physically separated from others of said plurality of reflector parts, wherein a first focal point of said reflector is said light source, and second focal points of said reflector are located at one of a position nearer said light source than said original image and a position farther away from said light source than said original image.

2. An image reading method according to claim 1, wherein a first focal point of each of said plurality of reflector parts is said light source, and second focal points are located at different regions from each other.

3. An image reading method according to claim 2, wherein a diffusion glass disposed at a more open end of said reflector is used.

4. An image reading method according to claim 1, wherein said reflector is divided into two parts and a first focal point of each of said two parts is said light source of said reflector, and second focal points of said two parts are located on different lines from each other.

5. An image reading method according to claim 4, wherein a diffusion glass disposed at a more open end of said reflector is used.

6. An image reading method according to claim 1, wherein a diffusion glass disposed at a more open end of said reflector is used.

7. An image reading method in which light emitted from a light source and reflected by a reflector is made, via a slit, into slit light whose longitudinal direction coincides with a direction perpendicular to a direction in which an original image is scanned, and the slit light is used to scan the original image, and one of light transmitted through the original image and light reflected by the original image is made to form an image on a light receiving surface of a solid-state image pickup device, thereby allowing reading of the original image,
   wherein the center of a range of the slit light in a direction perpendicular to the longitudinal direction of the slit light, on the light receiving surface of the solid-state image pickup device, and the center of a light receiving range of the light receiving surface of the solid-state image pickup device in the same direction as a transverse direction of the slit light are set so as to substantially coincide with each other, and the slit light on the light receiving surface of the solid-state image pickup device is set to have a width which is at least one and a half times the light receiving width of the light receiving surface of the solid-state image pickup device and in which a variation in the amount of light is 20% or less.

8. An image reading apparatus in which light emitted from a light source and reflected by a reflector is scanned on an original image via a slit, and one of light transmitted through said original image and light reflected by said original image is made to form an image on a light receiving surface of a solid-state image pickup device, thereby allowing reading of said original image, wherein said reflector is divided into a plurality of reflector parts disposed about said light source, each of said plurality of reflector parts being physically separated from others of said plurality of reflector parts, wherein a first focal point of said reflector is said light source, and second focal points of said reflector are located at one of a position nearer said light source than said original image and a position farther away from said light source than said original image.

9. An image reading apparatus according to claim 8, wherein a first focal point of each of said plurality of reflector parts is said light source of said reflector, and second focal points of said plurality of reflector parts are located at different regions from each other.

10. An image reading apparatus according to claim 9, comprising a diffusion glass disposed at a more open end of said reflector.

11. An image reading apparatus according to claim 8, wherein said reflector is divided into two parts and a first focal point of each of said two parts of said reflector is said light source, and second focal points of said two parts are located on different lines from each other.

12. An image reading apparatus according to claim 11, comprising a diffusion glass disposed at a more open end of said reflector.

13. An image reading apparatus according to claim 8, comprising a diffusion glass disposed at a more open end of said reflector.

14. An image reading method in which light emitted from a light source and reflected by a reflector is scanned on an original image via a slit, and one of light transmitted through the original image and light reflected by said original image is made to form an image on a light receiving surface of an image pickup device, thereby allowing reading of the original image, wherein said light source is an elongate shape whose longitudinal direction is perpendicular to a direction in which said original image is scanned, said slit is an elongate shape whose longitudinal direction is perpendicular to the direction in which said original image is scanned, wherein said reflector is divided into a plurality of reflector parts, each of said plurality of reflector parts being physically separated from others of said plurality of reflector parts, wherein first focal points of said plurality of reflector parts are said light source, and second focal points of said plurality of reflector parts are at positions other than on said original image.

15. An image reading apparatus in which light emitted from a light source and reflected by a reflector is scanned on an original image via a slit, and one of light transmitted through the original image and light reflected by said original image is made to form an image on a light receiving surface of an image pickup device, thereby allowing reading of the original image, wherein said light source is an elongate shape whose longitudinal direction is perpendicular to a direction in which said original image is scanned, said slit is an elongate shape whose longitudinal direction is perpendicular to the direction in which said original image is scanned, wherein said reflector is divided into a plurality of reflector parts, each of said plurality of reflector parts being physically separated from others of said plurality of reflector parts, wherein first focal points of said plurality of reflector parts are said light source, and second focal points of said plurality of reflector parts are at positions other than on said original image.

* * * * *